United States Patent
Busch et al.

(10) Patent No.: US 8,050,952 B2
(45) Date of Patent: Nov. 1, 2011

(54) DOCUMENTING OCCURRENCE OF EVENT

(75) Inventors: Stefan Busch, Heidelberg (DE); Patrick Bassler, Walldorf (DE); Wieslaw Pawelski, Walldorf (DE)

(73) Assignee: SAP AG, Walldorf (DE)

( * ) Notice: Subject to any disclaimer, the term of this patent is extended or adjusted under 35 U.S.C. 154(b) by 1346 days.

(21) Appl. No.: 11/404,629

(22) Filed: Apr. 14, 2006

(65) Prior Publication Data

US 2007/0005388 A1 Jan. 4, 2007

Related U.S. Application Data

(60) Provisional application No. 60/696,240, filed on Jul. 1, 2005.

(51) Int. Cl.
*G06Q 10/00* (2006.01)
(52) U.S. Cl. ...................................... 705/7.11
(58) Field of Classification Search ................... 705/7.11
See application file for complete search history.

(56) References Cited

U.S. PATENT DOCUMENTS

| | | | |
|---|---|---|---|
| 6,507,805 B1 * | 1/2003 | Gordon et al. | 702/186 |
| 6,754,612 B1 * | 6/2004 | Vanfladern et al. | 702/186 |
| 2002/0091718 A1 * | 7/2002 | Bohannon et al. | 707/202 |
| 2005/0167486 A1 * | 8/2005 | Horikawa et al. | 235/380 |
| 2005/0171833 A1 * | 8/2005 | Jost et al. | 705/10 |
| 2006/0064486 A1 * | 3/2006 | Baron et al. | 709/224 |
| 2006/0184410 A1 * | 8/2006 | Ramamurthy et al. | 705/8 |

OTHER PUBLICATIONS

"Time Stamp Specifications" [online]. SAP [retrieved on Apr. 6, 2006]. Retrieved from the Internet: <URL: http://help.sap.com/saphelp_erp2005/helpdata/en/92/24db41639bc417e10000000a155106/c...>.
"Semantics of the Data Types Date, Time, and Timestamp" [online]. SAP [retrieved on Apr. 6, 2006]. Retrieved from the Internet: <URL: http://help.sap.com/saphelp_nw04/helpdata/en/6c/7784ac804be2419f957e8434be6a07/conte...>.

* cited by examiner

*Primary Examiner* — Johnna Loftis
*Assistant Examiner* — Brandi P Parker
(74) *Attorney, Agent, or Firm* — Fish & Richardson P.C.

(57) ABSTRACT

A method of documenting occurrence of an event in a computer system includes receiving first event information forwarded upon a first event occurring in execution of a first step in a transaction process. The first event information includes a first step key, a first step type, and first time-of-occurrence information. The method includes identifying, upon receiving the first event information, an anchor step type that previously has been assigned for use in documenting the first event. The anchor step type is associated with an anchor step in the transaction process. The method includes reading, using the anchor step type, an anchor key of the anchor step in an execution log for the transaction process. The execution log is identified using the first step key. The method includes associating the anchor key with the first time-of-occurrence information. A performance measure having start and end events may be evaluated.

19 Claims, 4 Drawing Sheets

DOCUMENTING OCCURRENCE OF EVENT

CROSS-REFERENCE TO RELATED APPLICATION

This application claims priority from U.S. Provisional Application No. 60/696,240 filed Jul. 1, 2005, and entitled "Timestamp Service to Measure Service-Business Related Performance Key Figures," the entire contents of which are incorporated herein by reference.

TECHNICAL FIELD

The description relates to documenting the occurrence of an event in a computer system.

BACKGROUND

In today's business world, reporting and analyses are used as tools to help companies build and sustain their lead over the competition. Sophisticated reporting and analytics scenarios are required by customers that want to be able to analyze their complete service processing lifecycle—and also individual processing phases within this lifecycle—from a performance perspective, and to define and determine corresponding key figures and key performance indicators (KPIs). Such reporting may allow companies to identify and address their weaknesses as well as to recognize their strengths and to leverage them accordingly.

Some computer systems are configured to evaluate KPIs or other performance measures relating to the efficiency of procedures carried out using the system. For example, in the processing of customer interactions, one KPI can be defined as the time it takes from when a customer makes a request until the request is met. The KPI then provides a measure of whether the customers are being serviced promptly or whether there are unacceptable delays.

An exemplary computer-based service processing lifecycle starts with the initial customer contact with the service organization, continues through a number of further processing phases such as the creation of a quotation, an order, an assignment, a confirmation and an invoice, and could end with the payment of the invoice by the customer. In this example, the process goes through a number of documents that are essential for its completion. Moreover, a subsequent document may depend on the completion of an earlier one. Bottlenecks may therefore occur during processing, for example because departments are understaffed, key individuals neglect to perform critical duties, or because of deficiencies in the administrative flow of information and documents.

There is a challenge in measuring the duration of processing phases not only within a single document but also over the whole business process, which could contain more than one document and may involve disparate components of a complex system. To require that such system components continuously report detailed information to pinpoint the occurrence of various events may first of all require them to be designed contemplating this procedure, or to be extensively modified, and second may affect the performance of the whole process.

SUMMARY

The invention relates to documenting an event.

In a first general aspect, a method of documenting occurrence of an event in a computer system includes receiving first event information forwarded upon a first event occurring in execution of a first step in a transaction process. The first event information includes a first step key, a first step type, and first time-of-occurrence information. The method includes identifying, upon receiving the first event information, an anchor step type that previously has been assigned for use in documenting the first event. The anchor step type is associated with an anchor step in the transaction process. The method includes reading, using the anchor step type, an anchor key of the anchor step in an execution log for the transaction process. The execution log is identified using the first step key. The method includes associating the anchor key with the first time-of-occurrence information.

Implementations may include any or all of the following features. The method may be performed in an evaluation of a performance measure, wherein the first step type and at least a second step type previously have been assigned for use in the evaluation, wherein the anchor step type previously has been assigned for use also in documenting a second event associated with the second step type. Several performance measures may be defined, and at least the first step type may be associated with more than one of the several performance measures. Several events associated with the first step type may occur in the transaction process, and the method may further include reading an indicator that defines whether a first or a last of the several events is to be used in the evaluation. The method may include:

receiving second event information forwarded upon the second event occurring in execution of the second step in the transaction process, the second event information including a second step key, the second step type, and second time-of-occurrence information;

reading, using the anchor step type, the anchor key of the anchor step in the execution log for the transaction process, the execution log being identified using the second step key; and associating the anchor key with the second time-of-occurrence information.

The evaluation of the performance measure may include determining a time difference between the first time-of-occurrence information and the second time-of-occurrence information. The execution log may be read in reverse chronological order and the anchor step may be identified as the first one encountered in the reading that is associated with the anchor step type. Several transaction processes may be performed over time, and the association of the anchor step key with the first time-of-occurrence information may serve to distinguish the first time-of-occurrence information from other time-of-occurrence information associated with others of the transaction processes. The transaction process may involve several documents associated with individual steps, and the execution log may include a document flow reflecting processing of the documents. At least some of the several documents may be managed using different application programs in the computer system, each of the application programs being configured to provide information about corresponding events. A first document may be associated with the first step, and the first step key may be a document key of the first document. The first event may be one selected from the group consisting of: a status change and a date type. The first event may be a non-system event, and the method may further include assigning the date type to the first event.

In a second general aspect, a computer system includes at least one transaction process including several steps to be executed, and a service for receiving first event information upon a first event occurring in execution of a first step in the transaction process. The first event information includes a first step key, a first step type, and first time-of-occurrence information. The system further includes a record in which an anchor step type previously has been assigned to the first step type for use in documenting the first event, wherein the anchor step type is associated with an anchor step in the transaction process. The system further includes an execution log for each of the at least one transaction process that contains an anchor key of the anchor step, wherein the service identifies the execution log using the first step key, reads the anchor key and associates the anchor key with the first time-of-occurrence information.

Implementations may include any or all of the following features. The transaction process may involve several documents associated with the several steps, and the execution log may include a document flow reflecting processing of the several documents. At least some of the several documents may be managed using different application programs in the computer system, each of the application programs being configured to provide information about corresponding events. The service may read the execution log in reverse chronological order and identify the anchor step as the first one encountered in the reading that is associated with the anchor step. The service may further receive second event information forwarded upon a second event occurring in execution of a second step in the transaction process, the second event information including a second step key, a second step type, and second time-of-occurrence information, and the service may read, using the anchor step type, the anchor key of the anchor step in the execution log for the transaction process, the execution log being identified using the second step key, and associate the anchor key with the second time-of-occurrence information. The service may evaluate a performance measure by determining a time difference between the first time-of-occurrence information and the second time-of-occurrence information.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS FIG. 1 shows a block diagram of an exemplary system that documents the occurrence of an event.

Like reference numerals in the various drawings indicate like elements.

DETAILED DESCRIPTION

Figure 1:
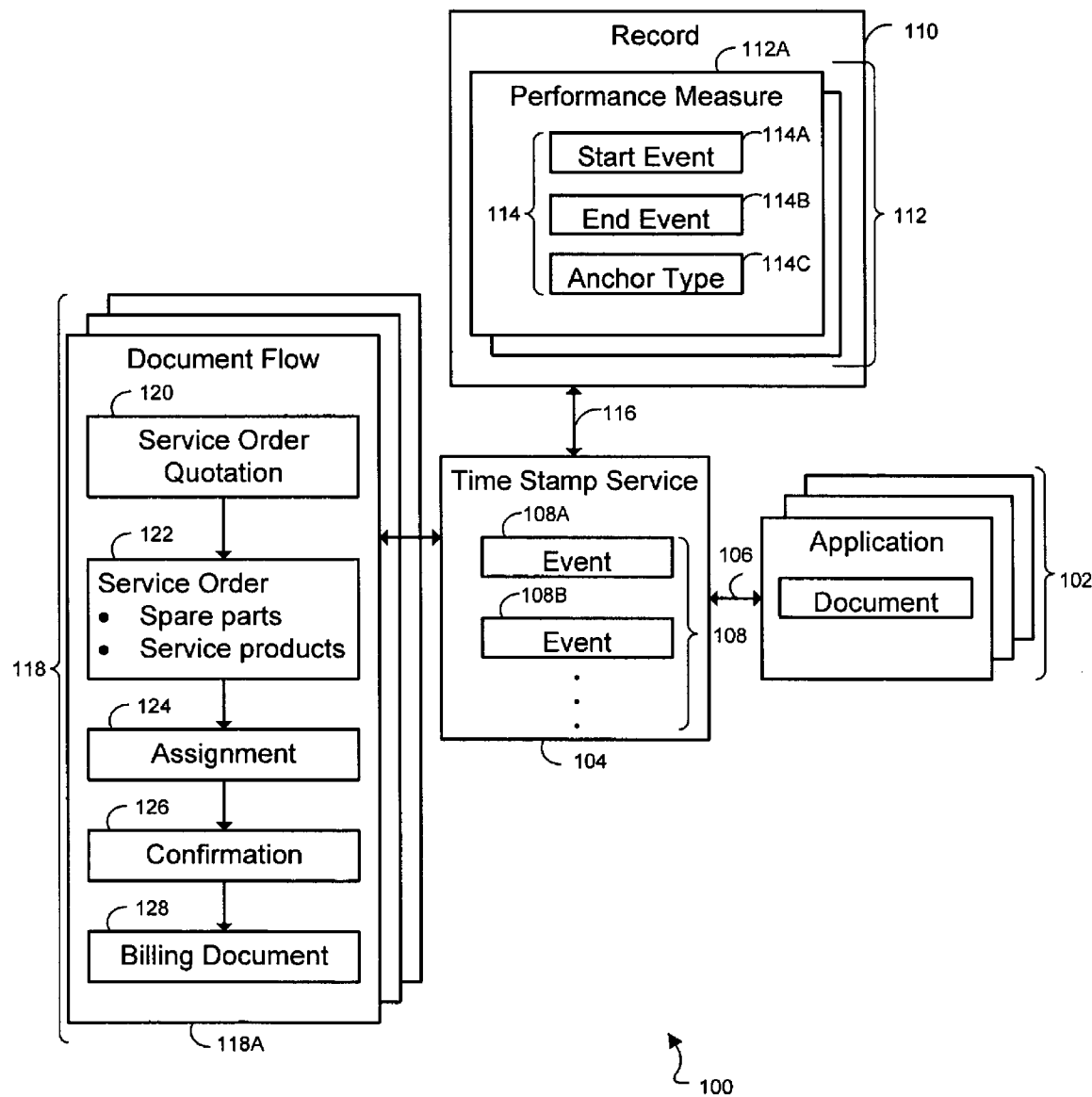

FIG. 1 shows a system 100 that is configured for documenting the occurrence of an event. For example, the organization that runs the system is interested in evaluating a performance measure to determine whether the processes of the system 100 are being performed effectively. The system can therefore register events that occur in execution of transactions, such as events defining the start and end of a predefined interval relevant to a performance measure, and record these events for evaluation of the performance measure.

The system 100 includes several application programs 102 that are configured to be executed in the performance of transactions and other processes in the system. For example, when the system 100 is configured for enterprise resource planning (ERP), one or more of the programs 102 are customer relationship management (CRM) programs. As such, the CRM programs can perform operations germane to CRM, such as generating the documents that reflect the customer's interactions and that drive the process toward its conclusion. Thus, for every customer that requests, say, service from the organization, there is initiated a flow of documents beginning with a service order quotation, then a service order, and so on. In each of these flows, the processing of the respective documents will generate events that the system should track to determine whether the process is flowing smoothly.

With service requests pending for several customers at once, the process for each one may be at a different stage than the others at any given time. This means that the service order for a first customer may be generated while the service request for another customer is still pending. Thus, the system 100 must distinguish between events occurring in processes for different customers. But the system 100 does not require detailed reporting from the application program(s) 102 to track which of the reported events are related to a particular customer. Rather, each application reports general information about the occurring event(s) and the system then matches this information with unique identifiers, for reliable performance measurement.

Particularly, the system 100 includes a service 104, here called a time stamp service, to which the applications 102 report during their processing, as indicated by an arrow 106. One advantage of the service 104 is that it can be used for documenting events that occur within a variety of different applications in the system, and also non-system events, as will be described later. Another advantage is that it allows for performance measures to be defined in a very flexible way, for example so that some of them are predefined and delivered with the system, and others being defined by the customer after installation.

The applications 102 forward event information 108 to the service 104 upon events occurring in the execution of the transaction processes. An example of what the event information may contain will be described below with reference to FIG. 2. The service 104 registers the event information 108 and later matches each event with additional information sufficient to evaluate the performance measure(s).

The system 100 includes a record 110 that, among other purposes, is used to define the performance measures that are to be determined. In some implementations, the record 110 includes the information that constitutes a configuration for, or a customizing of, the system. The record 110 may be included in the system upon delivery, containing the predefined performance measure(s), and can also be maintained by the customer to tailor the performance measurement to the customer's needs. For example, when the system 100 is an R/3 system which is a product available from SAP AG in Walldorf (Baden), Germany, the record 110 may be included in the Implementation Guidelines (IMG) provided therewith.

Here, the record 110 contains definitions for several performance measures 112. A first performance measure 112A is shown to include information 114 that defines what the performance measure is and how it is to be evaluated. Here, the information 114 includes a start event definition 114A of the event that starts the interval to be measured, an end event definition 114B for the event that ends the interval, and an anchor type definition 114C which will be described below. Assume, for example, that the start event definition 114A is the generation of a service order and that the end event definition 114B is the assignment of the service job to a particular employee. The performance measure 112A can then be used to measure the time it takes from when a service order is created for a customer's request until an employee is assigned to perform the service. Others of the performance measures 112 may measure other intervals, such as the time until the service has been completed or until an invoice is sent out. Yet others of the performance measures may relate to transaction steps that are not mentioned in this example.

One exemplary type of event that the application programs 102 report to the service 104 is that a service order has been generated, which is here illustrated as event information 108A. Upon receiving this event information, the service 104 does not know whether it is an event of significance-that is, if it is to be tracked and used in evaluating a performance measure-or whether it is an event that can be ignored. Moreover, the service 104 at that time does not have information to match the service order in this particular instance with the employee assignment relating to the same service.

The service 104 accesses the record 110 which contains information that the service can use to determine these matters, as indicated by an arrow 116. The service 104 compares the event information 108A to the information 114 to determine whether the former is to be used in evaluating the performance measure 112A. When several performance measures 112 have been defined in the record 110 the service should check the event against all of them, because the same event could be used in more than one of them.

Particularly, with regard to the performance measure 112A, the service 104 determines whether the received event information 108A matches either of the definitions 114A and 114B. These definitions may include metadata that defines the start event and end event of the relevant interval, for example by listing the types of these events.

If the event information does not match any of the predefined start or end events, the service 104 here ignores the event information. Now, in contrast, assume that the event information 108A does meet the definition 114A. For simplicity, it is here also assumed that this event is not to be used in any of the other performance measures 112. This means that the detected event—which in this example is a service order—should be used as the start event for the performance measure 112A. To evaluate the performance measure, the corresponding end event should also be identified, such that the time interval between the two can be determined. It is important that this evaluation use the correct end event—the one associated with the same instance of customer—requested service as the start event—or the determined time interval will be essentially meaningless.

However, the event information 108A that the service 104 receives from the application program 102 does not contain any unique identifier that identifies the corresponding end event. Such detailed reporting would require extensive modification of the application programs and may impact system performance. Upon learning that the detected event is significant, the service 104 begins the procedure of uniquely identifying the event information so that it can be documented unambiguously and used in evaluating the performance measure.

First, the service 104 reads the anchor step type 114C that is defined in the performance measure 112A. The anchor step type indicates a type of processing step (e.g., a type of document) that is included in the same transaction process as the start and end events. In other words, the specific anchor step is common to the execution histories of both the start event and the end event, and will be used in pairing the start and end events with each other.

For example, the first processing step in the transaction process may be chosen as the anchor step. The service 104 tracks the execution log for both start events and end events, and can then pair up those that correspond to the same particular anchor step. In contrast, the service will not pair up a start event and an end event that originate from two unrelated transaction processes, because they do not share the same particular anchor step.

In this example, the execution of every transaction process is logged in a document flow 118. The document flow makes it possible to track and step through each of the specific documents that is involved in the particular transaction process. Assume that a document flow 118A is generated in the processing that resulted in the event information 108A, corresponding to generation of the service order, being forwarded to the service 104. The document flow 118A therefore shows a service order quotation 120 reflecting that the customer has been sent a quotation for the service, a service order 122 representing the task of performing the service, an assignment 124 representing that the task has been assigned to one or more employees, a confirmation 126 indicating that the service has been performed, and a billing document 128 reflecting that the customer is being billed for the service. These documents may be handled by a single one of the application programs 102, or one or more of them may be handled by separate ones of the applications. For example, there may be a service order application, an assignment application, and so on. The particular documents mentioned here, and the number of them, are exemplary.

Every instance of a transaction process performed in the system 100 involves its own unique documents. The service 104 seeks to identify the anchor step that relates to the received event information, because this will allow the service to pair up the corresponding start and end events with each other, and not with unrelated events from other instances of the same type of transaction process. Particularly, starting from any document, the document flow allows stepping backward (towards earlier documents) or forward (toward later documents) throughout the entire flow, whereby the service can read the flow to find the relevant step (document).

The processing step that will be used in uniquely identifying the received event information is here referred to as the anchor step. The anchor step is the one that has the anchor step type defined by the record 110. Here, each of the transaction processes that relate to service orders begins with a quotation. It follows that there is only one service order quotation in each such document flow. Here, the service order quotation 120 is assigned as the anchor step through the definition 114C.

The assigned type of anchor step here occurs at the beginning of the document flow, and the time stamp service 104 may then be configured to read the document flow 118 in reverse chronological order. First, the service identifies the document flow 118A as the relevant one, and further identifies the specific step or document thereof from which the event information 108A is received. Here, that step corresponds to the service order document 122. Beginning at that document and reading backwards in the flow, the service identifies the service order quotation 120 as having the type defined by the definition 114C. The quotation is identified because it is the first one encountered, i.e., the one most recently generated in the document flow. The service then uses the service order quotation to individualize the event information 108A as being associated with the document flow 118A. For example, a key of the service order quotation document may be used.

Upon receiving additional event information, similar procedures are performed to match them up with unique information from the corresponding document flow. When events have been individualized, the service 104 can pair them up according to the definition of the performance measure (e.g., one start event and one end event) and calculate the measure. The measure may be a time interval from the start event to the end event.

For example, assume that event information 108B is next received and that this information corresponds to the assignment of a service order to an employee. The service 104 accesses the record 110 to determine whether it matches the definition of any start event, end event, or both. In this example, the event information 108B corresponds to the end event definition 114B and is therefore relevant for the performance measure 112A. The service reads the anchor type definition 114C for this performance measure and thereafter identifies and reads the appropriate document flow. Here, that is the document flow 118A. The service begins reading at the assignment 124 because the event information was generated in the processing of that document. The service reads the flow in reverse chronological order until it finds a step (document) that is associated with the anchor step type. Here, that is the service order quotation 120, because it matches the anchor step type 114C. The service then uses this step to individualize the event information 108B.

Because the service has now identified both a start event (the event information 108A) and an end event (the event information 108B) for the performance measure 112A, that measure can be calculated. In this example, the measure equals the time difference between when the service order was generated and when the assignment was made. This measure can then be stored in the system 100 or output to a user, to name two examples.

Figure 2:
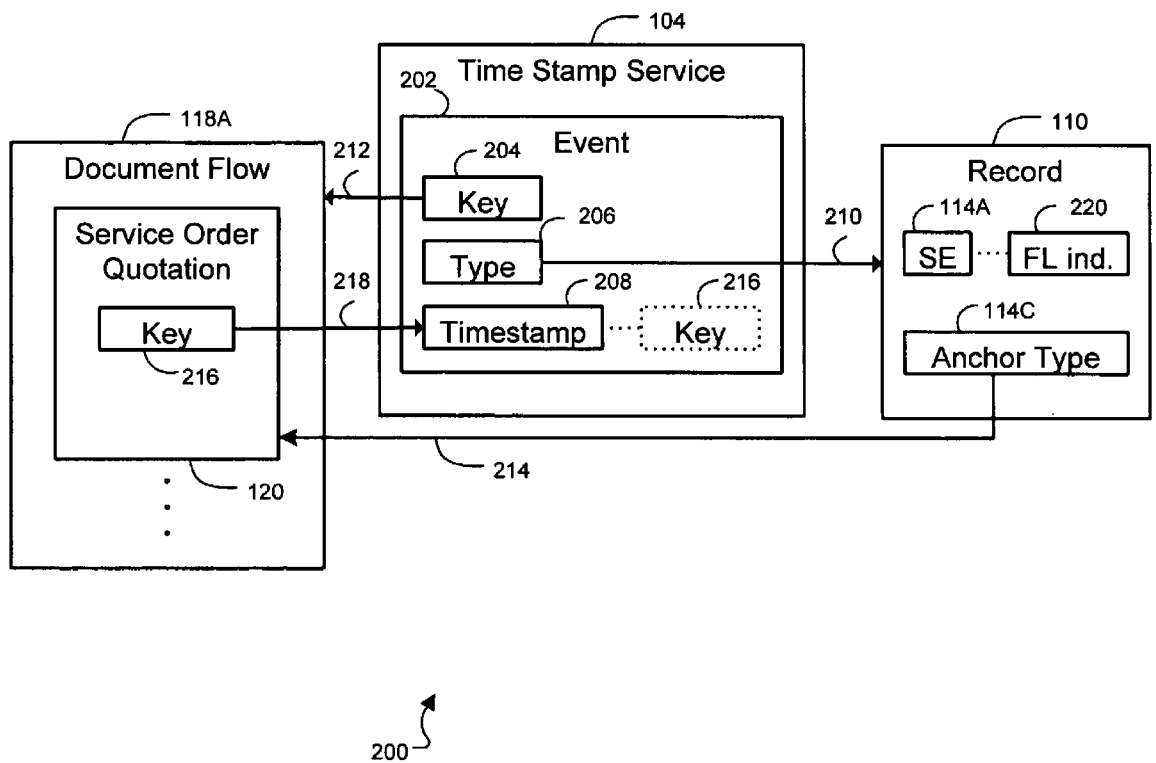
FIG. 2 shows a block diagram of exemplary interaction between components in the FIG. 1 system.

There will now be described, with reference to FIG. 2, an example of how the service 104 can operate. A system 200 here includes at least the time stamp service, the record 110, and the document flow 118A. The service receives event information 202 that is forwarded upon an event occurring in execution of a step in a transaction process. The information 202 includes a key 204 of the step where the event occurred, a type 206 of the step, and a timestamp 208 that contains time-of-occurrence information about the event. For example, the key 204 may include an identifier (e.g., GUID) of the particular document at a header or item level, such as identifying the service order document 122 or spare parts or service products items therein (see FIG. 1). The time-of-occurrence information may be expressed in the format: YYYYMMDDhhmmss, wherein YYYY indicates the year, MM the month, DD the day, hh the hour, mm the minute and ss the second that the event occurred. Other forms of time-of-occurrence information, for example those that include more or less specific information, may be used.

Here, the service 104 uses the type 206 to determine whether this step type is relevant to any performance measure defined in the record 110, as indicated by an arrow 210. If so, the service identifies the relevant document flow 118A using the key 204 of the event information, as indicated by an arrow 212. Then, in the relevant document flow, the service identifies the relevant anchor step using the anchor type definition 114C of the record, as indicated by an arrow 214. Particularly, the service reads a key 216 that uniquely identifies the service order quotation 120 (the anchor step in this example). For example, the key 216 may be a document key for the service order quotation 120. This allows the service to individualize the event information 202, for example by associating the key 216 with the timestamp 208, as indicated by an arrow 218. The event corresponding to the event information 202 has been documented by the system 200 and the record thereof can now be used for one or more purposes, such as to evaluate a performance measure.

The events that trigger the forwarding of event information may be of different kinds. For example, the change in status of any document may be such an event. As another example, the entry of an initialization date (sometimes referred to as a date type) for any of the documents may be registered. Other event types may be used. Particularly, in some implementations the service 104 can receive information that relates to non-system events. This may be done for example when there are so-called third-party components that interact in the transaction processing. As such, these components may be configured to output information upon occurrence of the event, but this information may differ from what the service 104 is configured for receiving. It may therefore be performed, in any of the systems 100 or 200, a conversion wherein a recognizable system event type is assigned to the non-system event. For example, in implementations where the service 104 is configured for receiving status change events and date type events, a date type may be assigned to the non-system event, and the service may thereafter process the data type similar to how it processes system date types.

In some transaction processes, the same type of event can occur multiple times in the same process. If such an event is to be used in evaluating a performance measure (e.g., as a start event or an end event), it must be determined which of the several occurrences is to be used. As an example, the start event definition 114A may be associated with a first/last event (FL) indicator 220. If the service 104 detects several events from the same transaction process that correspond to the start event, it will select one of them (i.e., the first one or the last one, depending on the indicator 220), for use in evaluating the performance measure. The FL indicator 220 can be used to choose between multiple events at the time of evaluation, or the service can adapt its storage behavior based on the FL indicator to keep only the relevant events.

Figure 3:
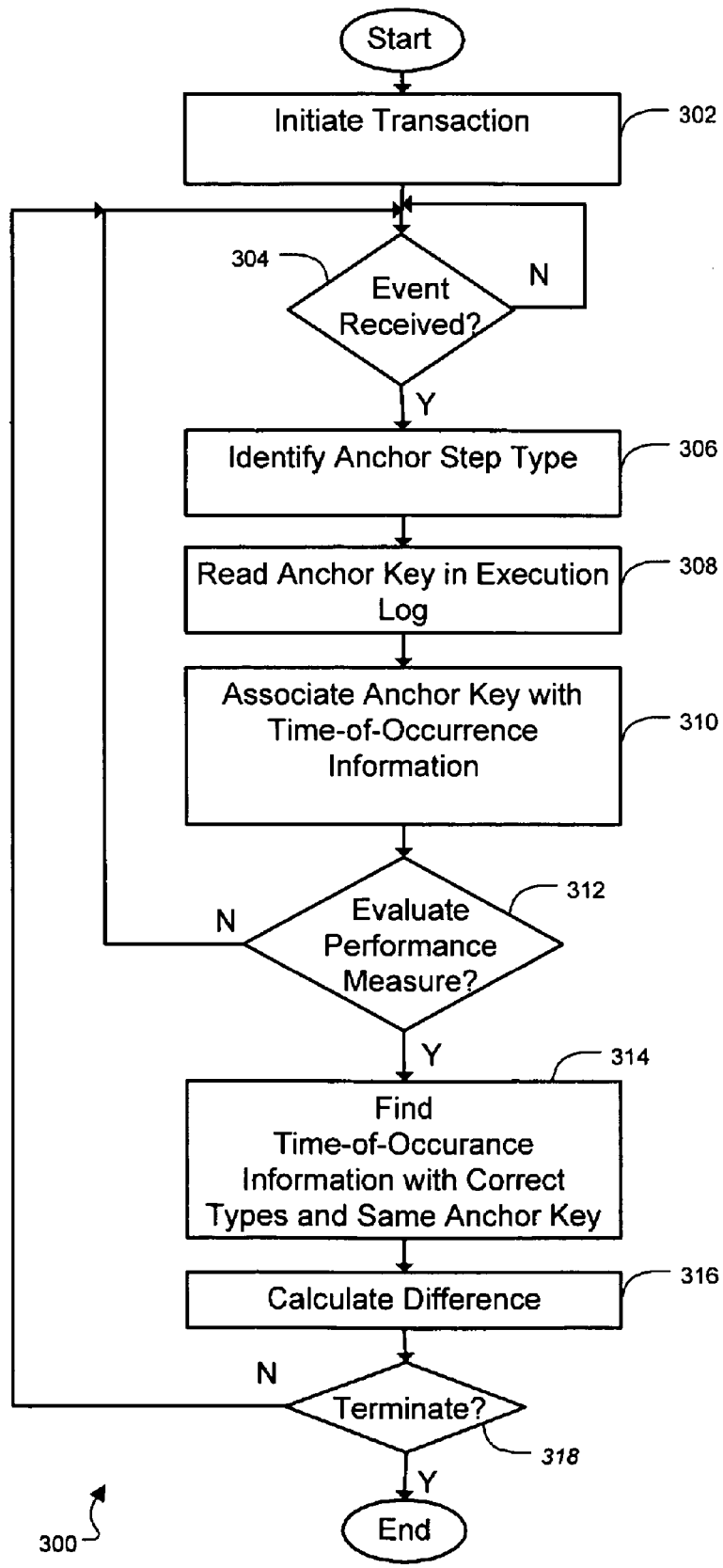
FIG. 3 shows a flow chart of an exemplary method for evaluating a performance measure.

FIG. 3 shows a flow chart of exemplary operations 300 that can be performed in any of the systems 100 or 200. A processor executing instructions stored in a computer program product can perform the operations 300. The operations 300 begin with initiating a transaction in step 302. For example, a transaction that begins with a service order request and that ends with billing documents can be initiated. The system may be configured for performing many different such transactions, or many instances of the transaction at once, or both.

In step 304, the operations 300 determine whether event information has been received. The event information is forwarded upon an event occurring in execution of a step in a transaction process. The event information includes a first step key, a first step type, and first time-of-occurrence information. For example, the service 104 can determine whether it has received event information from any of the application programs 202. If no event has been received, the step 304 is repeated.

If, in contrast, event information for a first event has been received, the operations continue with step 306 of identifying an anchor step type that previously has been assigned for use in documenting the first event. The anchor step type is associated with an anchor step in the transaction process. For example, the service 104 can access the record 110 and determine that the event information 108A is relevant to the performance measure 112A. From the information 114, the service can determine the anchor type definition 114C.

Step 308 includes reading, using the anchor step type, an anchor key of the anchor step in an execution log for the transaction process. The execution log is identified using the first step key. For example, the service 104 can use the key 204 to identify the document flow 118A, and therein read the key 216 of the service order quotation 120.

Step 310 includes associating the anchor key with the first time-of-occurrence information. For example, the service 104 can associate the key 216 with the timestamp 208.

In step 312, the operations 300 determine whether a performance measure is currently to be evaluated. If not, step 304 may be performed. For example, the service 104 can determine whether it has sufficient information for evaluating any of the performance measures 112.

If, in contrast, a performance measure is to be evaluated, the operations include finding, in step 314, time-of-occurrence information having the correct type and the same anchor key. For example, the service 104 can determine that the two portions of event information 108A and 108B are of the types that match the start and end events of the performance measure 112A, and that each of them is associated with the key of the same anchor step. The difference between the respective time-of-occurrence information (e.g., between the time stamps), can be calculated in step 316. In step 318, the operations determine whether to terminate or return to step 304.

Figure 4:
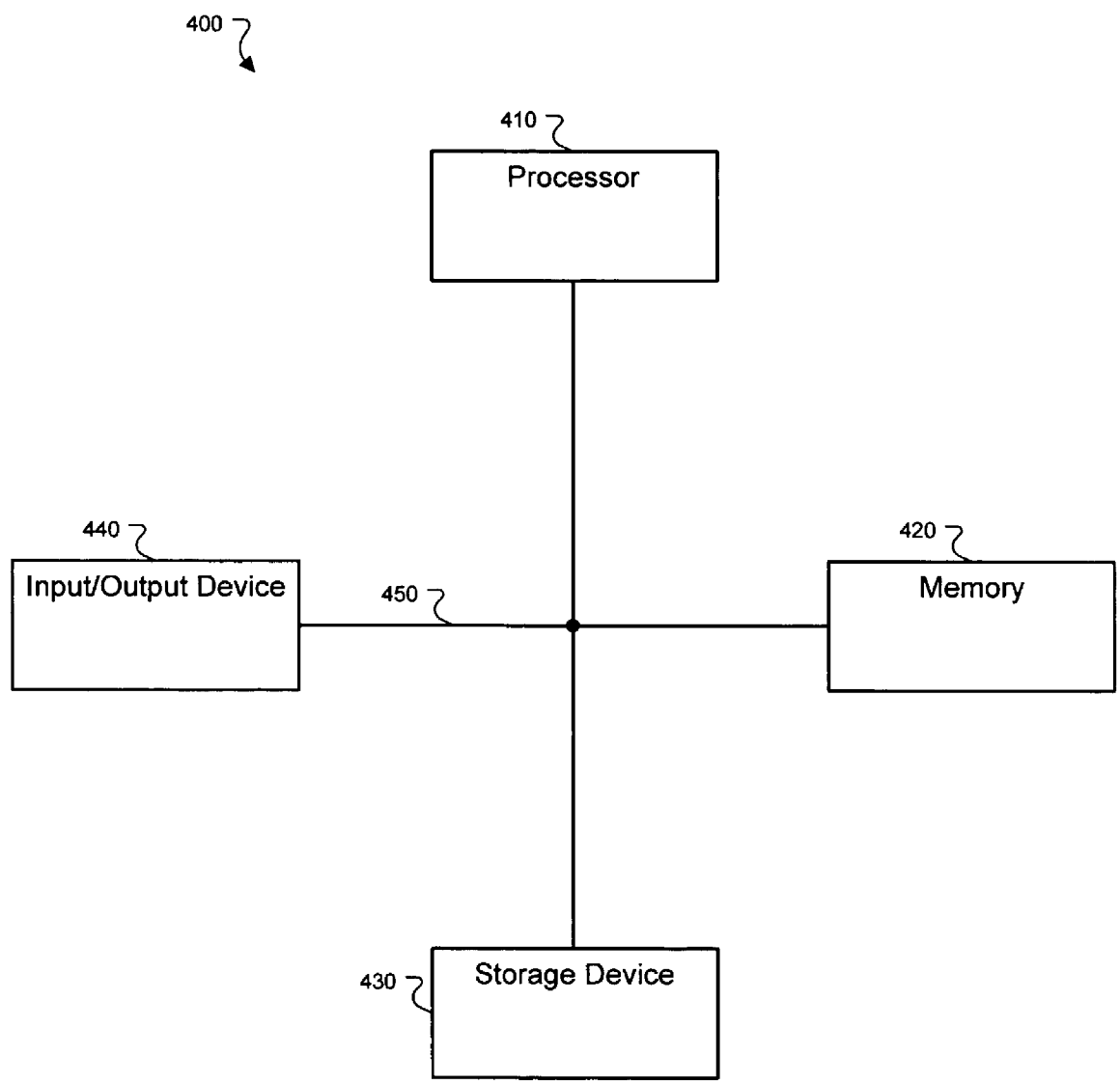
FIG. 4 shows a block diagram of a general computer system.

FIG. 4 is a block diagram of a computer system 400 that can be used in the operations described above, according to one embodiment. For example, the system 400 may be included in either or both of the systems 100 and 200.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one embodiment, the processor 410 is a single-threaded processor. In another embodiment, the processor 410 is a multi-threaded processor. The processor 410 is capable of processing instructions stored in the memory 420 or on the storage device 430 to display graphical information for a user interface on the input/output device 440.

The memory 420 stores information within the system 400. In one embodiment, the memory 420 is a computer-readable medium. In one embodiment, the memory 420 is a volatile memory unit. In another embodiment, the memory 420 is a non-volatile memory unit.

The storage device 430 is capable of providing mass storage for the system 400. In one embodiment, the storage device 430 is a computer-readable medium. In various different embodiments, the storage device 430 may be a floppy disk device, a hard disk device, an optical disk device, or a tape device.

The input/output device 440 provides input/output operations for the system 400. In one embodiment, the input/output device 440 includes a keyboard and/or pointing device. In one embodiment, the input/output device 440 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method of documenting occurrence of an event in a computer system, the method comprising:

receiving, at a computer system, first event information forwarded upon a first event occurring in execution of a first step in a transaction process, the first event information including a first step key, a first step type, and first time-of-occurrence information, wherein the transaction process includes a plurality of documents that each outline one or more steps for completing a portion of the transaction process, wherein the first step is associated with a first document of the plurality of documents, and wherein the first event information is generated by one of a plurality of applications that provides information in association with the first event that is limited to the first step key and the first step type, wherein the first step key identifies the transaction process and the first step type identifies a type for the first step;

identifying, by the computer system upon receiving the first event information, an anchor step type based on the first step type matching a previously identified type of event for which performance metrics are to be generated, wherein the anchor step type identifies an anchor step in the transaction process that is associated with the first document;

reading, by the computer system using the anchor step type, an anchor key of the anchor step in an execution log for the transaction process, the execution log being identified using the first step key, wherein the anchor key identifies the first document; and associating the anchor key with the first time-of-occurrence information in the computer system for the first event.

2. The method of claim 1, performed in an evaluation of a performance measure, wherein the first step type and at least a second step type previously have been assigned for use in the evaluation, wherein the anchor step type previously has been assigned for use also in documenting a second event associated with the second step type.

3. The method of claim 2, wherein several performance measures are defined, and wherein at least the first step type is associated with more than one of the several performance measures.

4. The method of claim 2, wherein several events associated with the first step type occur in the transaction process, further comprising reading an indicator that defines whether a first or a last of the several events is to be used in the evaluation.

5. The method of claim 2, further comprising:

receiving second event information forwarded upon the second event occurring in execution of the second step in the transaction process, the second event information including a second step key, the second step type, and second time-of-occurrence information;

reading, using the anchor step type, the anchor key of the anchor step in the execution log for the transaction process, the execution log being identified using the second step key; and associating the anchor key with the second time-of-occurrence information.

6. The method of claim 5, wherein the evaluation of the performance measure comprises determining a time difference between the first time-of-occurrence information and the second time-of-occurrence information.

7. The method of claim 1, wherein the execution log is read in reverse chronological order and the anchor step is identified as the first one encountered in the reading that is associated with the anchor step type.

8. The method of claim 1, wherein several transaction processes are performed over time, and wherein the association of the anchor step key with the first time-of-occurrence information serves to distinguish the first time-of-occurrence information from other time-of-occurrence information associated with others of the transaction processes.

9. The method of claim 1, wherein the execution log comprises a document flow reflecting processing of the plurality of documents as part of the transaction process.

10. The method of claim 9, wherein at least some of the plurality of documents are managed using different application programs of the plurality of applications in the computer system, each of the application programs being configured to provide information about corresponding events.

11. The method of claim 1, wherein the first event is one selected from the group consisting of: a status change and a date type.

12. The method of claim 11, wherein the first event is a non-system event, further comprising assigning the date type to the first event.

13. A computer program product tangibly embodied in a computer-readable medium, the computer program product including instructions that, when executed, cause a processor to perform operations comprising:

receiving first event information forwarded upon a first event occurring in execution of a first step in a transaction process, the first event information including a first step key, a first step type, and first time-of-occurrence information, wherein the transaction process includes a plurality of documents that each outline one or more steps for completing a portion of the transaction process, wherein the first step is associated with a first document of the plurality of documents, and wherein the first event information is generated by one of a plurality of applications that provides information in association with the first event that is limited to the first step key and the first step type, wherein the first step key identifies the transaction process and the first step type identifies a type for the first step;

identifying, upon receiving the first event information, an anchor step type based on the first step type matching a previously identified type of event for which performance metrics are to be generated, wherein the anchor step type identifies an anchor step in the transaction process that is associated with the first document;

reading, using the anchor step type, an anchor key of the anchor step in an execution log for the transaction process, the execution log being identified using the first step key, wherein the anchor key identifies the first document; and associating the anchor key with the first time-of-occurrence information for the first event.

14. A computer system comprising:

a processor that is configured to perform:

at least one transaction process including a plurality of documents that each outline one or more steps for completing a portion of the transaction process, and a service for receiving first event information upon a first event occurring in execution of a first step in the transaction process, the first event information including a first step key, a first step type, and first time-of-occurrence information, wherein the first step is associated with a first document of the plurality of documents, and wherein the first event information is generated by one of a plurality of applications that provides information in association with the first event that is limited to the first step key and the first step type, wherein the first step key identifies the transaction process and the first step type identifies a type for the first step; and a computer-readable storage device that is configured to store:

a record in which an anchor step type previously has been assigned to the first step type for use in documenting the first event, wherein the anchor step type identifies an anchor step in the transaction process that is associated with the first document, and an execution log for each of the at least one transaction process that contains an anchor key of the anchor step, wherein the anchor key identifies the first document, wherein the service identifies the execution log using the first step key, identifies the anchor step type based on the first step type matching a step type included in the record, reads the anchor key from the execution log using the anchor step type, and associates the anchor key with the first time-of-occurrence information for the first event.

15. The computer system of claim 14, wherein the execution log comprises a document flow reflecting processing of the plurality of documents as part of the transaction process.

16. The computer system of claim 15, wherein at least some of the plurality of documents are managed using different application programs of the plurality of applications in the computer system, each of the application programs being configured to provide information about corresponding events.

17. The computer system of claim 14, wherein the service reads the execution log in reverse chronological order and identifies the anchor step as the first one encountered in the reading that is associated with the anchor step.

18. The computer system of claim 14, wherein the service further receives second event information forwarded upon a second event occurring in execution of a second step in the transaction process, the second event information including a second step key, a second step type, and second time-of-occurrence information, and wherein the service reads, using the anchor step type, the anchor key of the anchor step in the execution log for the transaction process, the execution log being identified using the second step key, and associating the anchor key with the second time-of-occurrence information.

19. The computer system of claim 18, wherein the service evaluates a performance measure by determining a time difference between the first time-of-occurrence information and the second time-of-occurrence information.

* * * * *